United States Patent Office 2,744,199
Patented May 1, 1956

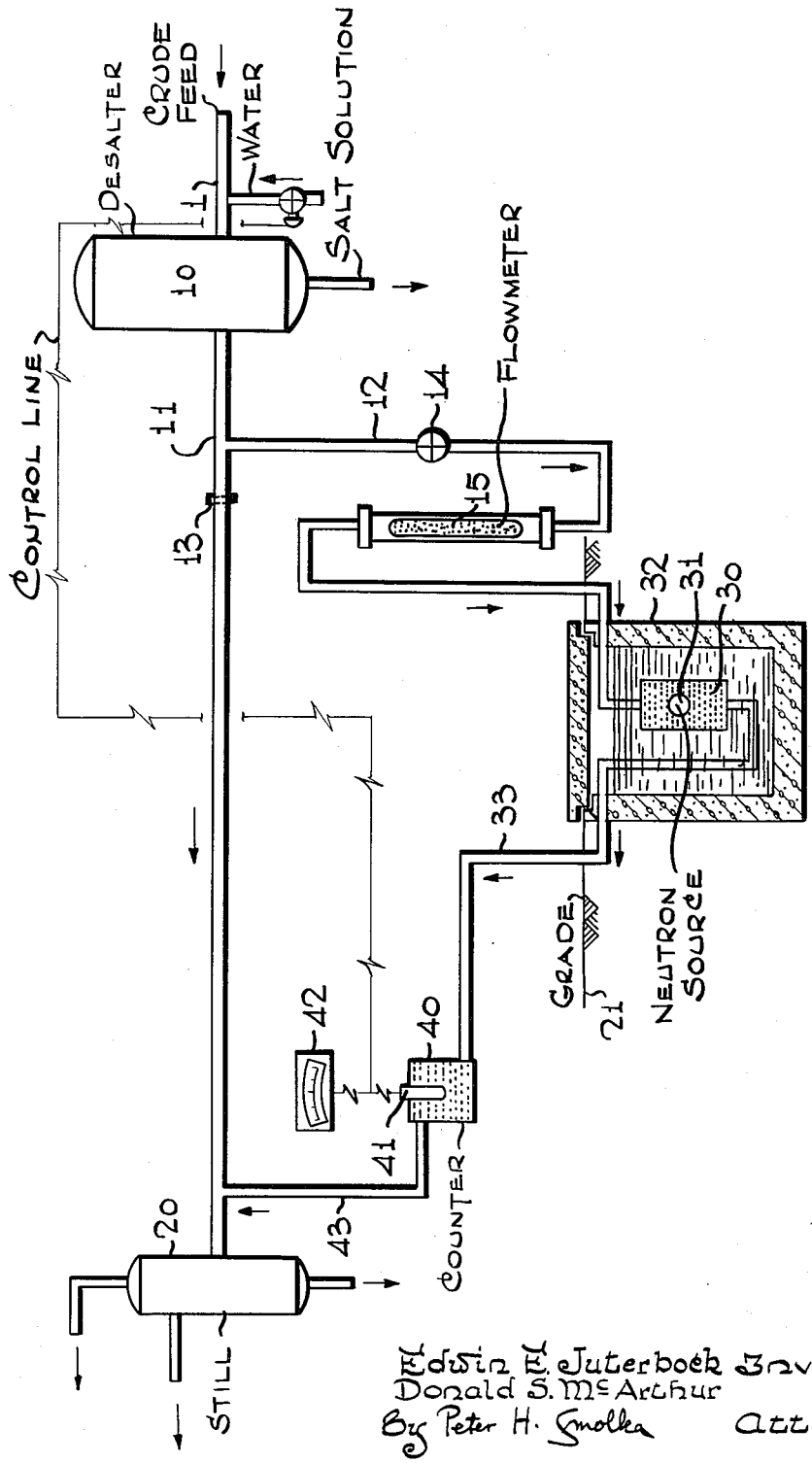

2,744,199

DETERMINATION OF HALOGEN IN OIL STREAMS

Edwin E. Juterbock, Short Hills, and Donald S. McArthur, Elizabeth, N. J., assignors to Esso Research and Engineering Company, a corporation of Delaware Application November 28, 1952, Serial No. 322,932

12 Claims. (Cl. 250—43.5)

The present invention relates to the determination of halogen in hydrocarbon streams by use of the radioactive tracer technique. More particularly, the invention relates to a method and device for determining the concentration of chlorine compounds in crude oil and other oil streams.

Crude oil and various hydrocarbon fractions derived therefrom often contain appreciable concentrations of inorganic salts which can cause serious corrosion and other difficulties in operations such as distillation, catalytic cracking or combustion. For this reason, hydrocarbon streams contaminated with inorganic salts are often desalted prior to processing so as to reduce the salt concentration to a tolerable level such as 10 pounds per 1000 barrels, or preferably less than 2 pounds per 1000 barrels.

Chlorine in the form of a chloride such as sodium, calcium or magnesium chloride often is an important constituent of the undesirable contaminants present in the crude oil or other hydrocarbon stream being treated. Consequently, the efficiency of crude desalting operations has been heretofore determined by periodically drawing a sample of oil from the desalter outlet, extracting it with water, and gravimetrically determining the chloride content of the extract. However, this analysis is so tedious that it is generally impractical to make more than one such determination daily. Speedier analytical methods, such as flame photometry, have been proposed for the purpose at hand. But they have not found favor because of lack of accuracy, and also because of the complete destruction of the oil sample being analyzed.

It is the object of this invention to provide a fast, accurate, non-destructive method for determining the salt concentration of oil streams, on a continuous basis if desired. A related object is to provide an apparatus capable of making such determinations. These and other objects will become more clearly apparent from the subsequent description and attached drawing.

The drawing shows a schematic layout of a salt content analyzer embodying the present invention.

According to the present invention induced radioactivity has been adapted for use as a direct measure of the chlorine concentration of the stream being analyzed. This has been found possible since ordinary chlorine contains about 25 per cent of isotope $Cl^{37}$ which absorbs neutrons to give radioactive $Cl^{38}$, whose radioactivity can be measured. In particular, when the chlorine concentration of a stream of desalted crude or other stream is to be determined, the entire stream, or preferably an aliquot portion thereof is continuously flowed past a neutron source, and the radioactivity of the resulting activated oil is measured by a suitable counter. If desired, a recording device can be attached to the counter to give a continuous record of the measured impulses, and hence of the salt content of the analyzed stream.

Referring specifically to the drawing, a typical system embodying the present invention will now be described in greater detail for purposes of illustration.

Fresh crude oil containing about 25 pounds of salt per 1000 barrels is fed through line 1 into desalter 10. In the desalter the oil is mixed with water and emulsifier, and the resulting emulsion is electrically precipitated in the desire to reduce its salt content to not more than 10 pounds of salt per 1000 barrels of oil. Since a typical refinery may treat 50,000 barrels of crude per day in such a unit, control of desalting efficiency is an important consideration. The desalted oil then may pass through line 11 to a distillation tower 20 where it is separated into desired fractions such as gasoline, gas oil and reduced crude.

According to the present invention, some of the desalted oil is bled off from line 11 via line 12 for analysis. The necessary hydraulic head can be obtained by placing a suitable orifice 13 in main line 11 downstream from the bleed-off line in a manner otherwise well known. The flow rate through line 12 is metered through flow meter 15 and adjusted by needle valve 14 as necessary. The oil then passes to an activation chamber 30. For instance, chamber 30 may hold about 2 gallons of oil in close contact with the neutron source 31. At a flow rate of about 4 gallons per hour the residence time of the oil in such an activation chamber will be approximately ½ hour.

Generally speaking, it is desirable to choose the volume of the activation chamber and the flow rate therethrough such that the oil will reside in the chamber for a period equal to about ¼ to 3 times the half-life of the radioactive isotope. Thus, since $Cl^{38}$ has a half-life of 38 minutes, residence times of about 10 to 120 minutes are normally preferred herein. To get a fast determination of the efficiency of the desalter, it is desirable to have the volume of the activation chamber just big enough to take in a little more than the whole penetration range of the neutron source, and to have the residence time as short as practicable for an accurate radioactivity count. It will be understood, of course, that shorter residence times in the activation chamber are permissible when a relatively strong neutron source is used, or when a stream having a high chlorine content is being analyzed. Accordingly, residence times as short as 1 minute, or even 1 second, may be appropriate under specific circumstances.

During the residence in the activation chamber the chlorine atoms in the oil are activated by neutron absorption to form the radioactive isotope $Cl^{38}$. The activated oil passes from the activation chamber via line 33 to a counting chamber 40. Here the gamma radiation from the disintegration of the radioactive chlorine is measured by means of a scintillation tube 41 and counted and recorded with suitable electrical equipment 42 in an otherwise well known manner.

As is well known, the scintillation tube contains an easily excitable substance such as a solid crystal of thallium activated sodium iodide or naphthalene, or a liquid such as benzene, benzene solutions of naphthalene or anthracene, and so on, all substantially as described in Nucleonics, vol. 7, No. 3, pp. 32–37 (September 1950) and in The Physical Review, vol. 78, No. 4, p. 488 (May 1950). These substances visibly scintillate by releasing photons when exposed to the gamma radiation of the activated oil. The scintillation count is a measure of the radioactive atoms which disintegrate in the oil, and hence a measure of the salt content of the oil. The optical impulses caused by the released photons are advantageously fed through a photomultiplying unit or a photoelectric cell, whereby they are converted into electric impulses which can be readily counted. An automatic recording device can be attached to the electric counter to give a continuous record of the scintillation count, usually in terms of the number of scintillations per hour or any other convenient time interval. If desired, the impulses from counter 41 can also be used to actuate valves or other control means of the desalting process so as to maintain the salt content of the desalted oil at the desired value.

After passing through counting chamber 40, the activated oil may be returned to the main process through line 43, inasmuch as its radioactivity is of such a low level as to be harmless.

While the effluent from counting chamber 40 is harmless, it is of course desirable to protect operating personnel by providing adequate shielding for the neutron source 31. For this reason the activation chamber 30 may advantageously be immersed in a heavy concrete container 32 containing about 100 gallons of water. For additional protection it is desirable to construct the concrete container below ground level 21. In the shown arrangement the water will absorb stray neutrons and the concrete will shield against gamma radiation, but it will be understood that other known shielding materials, such as lead, may be employed.

To further illustrate the invention, a typical calculation will be given. A useful laboratory size radium-beryllium neutron source will emit about $10^7$ neutrons per second. Essentially all of these will be absorbed by the oil in the described activation chamber. Most of the neutrons will be absorbed by the hydrogen of the oil to form non-radioactive deuterium, but some will be absorbed by the chlorine of the salt to form radioactive $Cl^{38}$. The number absorbed by each of these elements will be in proportion to the number of atoms of each element present and to the absorption cross-section for each of the elements. The neutrons absorbed by other elements in the crude oil can be neglected.

To make the determination significant, it is necessary to know how many neutrons will be absorbed by the chlorine atoms and how many radioactive chlorine atoms in the activated oil will disintegrate per second. The instrument can be calibrated to give the chlorine concentration directly in terms of the rate of atomic disintegrations. For instance, if the crude contains 10 pounds of sodium chloride per 1000 barrels, that is, 10 pounds of salt per 300,000 pounds of crude, the number of chlorine atoms, or sodium chloride molecules (molecular weight 58.5), in the amount of crude is given by:

$$\frac{10 \text{ lbs.} \times 454 \text{ g./lb.} \times 6.06 \times 10^{23} \text{ atoms}}{58.5}$$

For purposes of calculation the crude may be assumed to have the formula $(-CH_2-)_n$.

The number of atoms of hydrogen in the 300,000 pounds of crude is given by:

$$\frac{300{,}000 \text{ lbs.} \times 454 \text{ g./lb.} \times 2n \times 6.06 \times 10^{23} \text{ atoms}}{14n}$$

The ratio of the number of chlorine atoms to the number of hydrogen atoms present in the crude is therefore given by:

$$\frac{\frac{10 \times 454 \times 6.06 \times 10^{23}}{58.5}}{\frac{300{,}000 \times 454 \times 2n \times 6.06 \times 10^{23}}{14n}} = \frac{7}{58.5 \times 3 \times 10^4}$$

The susceptibility of an atom to bombardment by neutrons is measured in terms of neutron absorption cross-section. Units of measurement of such absorption cross-sections are "barns," one barn being equal to $10^{-24} \text{cm}.^2$. The proportion of neutrons which are absorbed by chlorine atoms in the analyzed oil stream is determined by the ratio of the number of chlorine atoms to the number of hydrogen atoms, multiplied by the ratio of the respective absorption cross-sections. The neutron absorption cross-section for the hydrogen atoms is about 0.3 barn, and for chlorine atoms which normally contain about 25% of isotope $Cl^{37}$ the cross-section is about 0.14 barn, as shown, for instance, on the Chart of Nuclides, published by the G. E. Research Laboratory in 1950. Consequently, the proportion of the neutrons absorbed by the chlorine atoms is given by:

$$\frac{7}{58.5 \times 3 \times 10^4} \times \frac{0.14}{0.3}$$

Since the radium-beryllium source used in the present illustration emits about $10^7$ neutrons per second, it follows from the foregoing calculations that the number of neutrons absorbed by the chlorine atoms will be given by:

$$\frac{7 \times 0.14 \times 10^7}{58.5 \times 3 \times 10^4 \times 0.3} \text{ neutrons/second} = 19 \text{ neutrons/second}$$

Thus in the illustrative system about 19 radioactive chlorine atoms ($Cl^{38}$) will be formed every second. Some of these radioactive atoms will disintegrate. The greater the number of active atoms present, the greater will be the number of disintegrations. If the irradiation were continued indefinitely, the concentration of radioactive chlorine atoms would finally increase to the point of equilibrium where the number of radioactive atoms disintegrating would equal the number of such atoms being formed. However, in the illustrative system the oil is being exposed to the neutron flux for only ½ hour, since it is normally impractical for the purposes of this invention to continue irradiation until the equilibrium is reached.

In any event, the rate of atom disintegrations is given by:

$$A = 19\left(1 - e^{-\frac{0.693 t}{T_{\text{half}}}}\right)$$

wherein:

$A$ = number of atom disintegrations per second;
$\frac{0.693}{T_{\text{half}}}$ = decay constant wherein $T_{\text{half}}$ is the half-life of the particular atom, in seconds. For $Cl^{38}$ this value is 2280 seconds; and
$t$ = time of irradiation by neutron beam, in seconds. In the example the oil is irradiated for 1800 seconds.

Then:

$$A = 19\left(1 - e^{-\frac{0.693}{2280} \times 1800}\right)$$

$= 8$ disintegrations/second

It follows that the oil coming from the activation cell will have an activity of eight disintegrations per second in each two-gallon volume.

This activated oil flows to the counting cell. By making the counting cell the same in volume as the activation cell, that is, two gallons, the number of atomic disintegrations therein will also be eight per second, or 480 per minute. By use of an efficient scintillation counter of the well-known type heretofore described, it is possible to count at least about 10% of the occurring disintegrations, or 48 per minute. This activity is accurately measurable provided that the background count due to radiation from the neutron source, and possibly also cosmic rays, is reduced by proper shielding, as is well known. Sufficient shielding is normally obtained by arranging the neutron source as heretofore described. However, additional shielding may be similarly provided for the counting cell itself. In newer, improved counters wherein the detecting or scintillating material is disposed around the measured stream in the form of a surrounding annulus instead of a central core or crystal, counting efficiencies as high as 90% can be achieved.

Thus the number of atomic disintegrations will be a direct measure of the concentration of chlorine, or of chloride salt, in the oil. As indicated above, it is preferred to use an integrating device which automatically records the number of disintegrations occurring every half hour or during other convenient intervals. In the illustrative system these half-hour readings then indicate the salt content of the oil which was treated in the desalter about 1 hour previously.

With the source and exposure used herein, the present method may be sensitive to about 1 lb. of salt per 1000 barrels of oil, or about 3 parts per million. Still better sensitivities can be obtained by use of improved counters, stronger neutron sources, and so on.

It is apparent from the foregoing that the present invention offers a very advantageous method for measuring the salt content of petroleum oil streams. This is due largely to the fact that no serious interference is caused by any of the numerous other elements normally present in crude oil or the like. Carbon, hydrogen, oxygen, and nitrogen will not form radioactive isotopes in this system.

Sulfur does form a radioisotope if bombarded by the neutrons for several days. However, in periods of less than about one hour essentially no active sulfur is formed with a neutron source of the strength described herein. Whatever weak beta radiation may be emitted by the sulfur, is cut out by the thin wall of glass or metal, which surrounds the scintillation counter. Iron also forms a radioisotope upon extended irradiation, but essentially no radioactive iron is formed in the irradiation periods contemplated herein.

Bromine also forms a radioisotope, $Br^{80}$, which emits weak gamma radiation. Some of this is counted along with the chlorine, but generally the bromine concentration is relatively small. In any event, the combined measurement of chlorine and bromine may actually be preferred as a measure of the salt content of the crude, since it reflects the total salt content more completely than a measurement based on chlorine alone.

Vanadium, which often is present in crude oil in amounts of the order of one part per million, also forms a radioisotope. However, its half-life is only 3.8 minutes so that it will mostly die out in its trip from the activation cell to the counting cell. Of course, where appreciable amounts of vanadium can be normally expected in the oil being analyzed, it may be desirable to arrange the measuring apparatus and flow rate in such a manner that it will take about 1.5 to 3 vanadium half-lives (about 5 to 15 minutes) for the oil stream to flow from the irradiation cell to the counting cell.

A radium-beryllium neutron source is preferred since it has the advantage of being relatively permanent. Also its ability to emit intensive radiation from a relatively small volume is of great importance in the present invention. However, neutron sources containing beryllium in combination with various other metals are also useful. Beryllium is almost unique in that it emits neutrons when bombarded by alpha or gamma radiation. It is for this reason that the neutron source normally includes radium or some other radioactive element in addition to beryllium. For instance, antimony-beryllium is a very customary neutron source, though it dies out rather quickly. Cobalt-beryllium is another available and relatively cheap source. Polonium-beryllium is also a practical combination, though a very expensive one. In all cases, of course, proper shielding is required, since a neutron source to be useful in the present invention may have an activity of at least about 2 to 100 or more curies. The most readily available portable beryllium-radium sources, such as those which can be rented from the U. S. Atomic Energy Commission, have an activity of about 30 curies, and emit about $10^7$ neutrons per second.

Of course, very much stronger sources may be used likewise, especially where the chlorine concentration is relatively low, or where exceptional sensitivity is desired. For instance, when an atomic pile is being used nearby as a source of power or the like, it may be practical to pass the stream to be analyzed through the pile for neutron bombardment. Conversely, where the chlorine concentration is relatively high, or only semi-qualitative data are required, neutron sources emitting substantially less than $10^7$ neutrons per second can be used.

The foregoing specification describes the general nature of the invention and gives a specific example thereof. However, it will be apparent to those skilled in the art that numerous modifications and variations are possible without departing from the scope and spirit of this invention. For instance, while the invention has been described principally with reference to desalting of crude oil, it can be similarly used for determining the inorganic salt content of gas oils or lighter stock, or for controlling the concentration of chlorinated additives such as chlorinated wax or chlorinated phenol in lubricating oil, or for detecting residual chlorine in "Paraflow" which is a reaction product of chlorinated wax and naphthalene, or for measuring the concentration of methyl or ethyl chloride diluent in the low-temperature polymerization of isobutylene-isoprene synthetic rubber, or for determining the concentration of chlorinated solvent such as trichloroethylene in the extraction of soybean or fish oils, and in numerous other systems requiring information about the concentration of chlorine or chlorine-containing compounds in an oil or hydrocarbon stream.

The subject matter which constitutes the essence of the present invention is particularly pointed out in the appended claims.

We claim:

1. A process for determining the concentration of chlorine in hydrocarbon materials which comprises passing a stream of said hydrocarbon materials through an activation zone having a predetermined volume and at a rate predetermined to produce a residence time of said hydrocarbon materials in said activation zone for a period substantially equal to from about one-quarter to about three times the half-life of the radioactive isotope $chlorine^{38}$, bombarding said hydrocarbon materials with neutrons having a strength of at least 2 curies during passage of said hydrocarbon materials through said activation zone, producing radioactive isotopes of chlorine contained therein, and of any other element therein of which the isotope has a half-life shorter than that of $chlorine^{38}$, while substantially avoiding significant activation of such elements present in said materials of which the isotopes have half-life characteristics longer than that of $chlorine^{38}$, discharging said hydrocarbon materials from said activation zone through a confined flow path for said hydrocarbon materials, retaining said materials in said flow path for a period of time substantially equal to from about one and one-half to about three times the half-life of any isotope having a half-life shorter than that of $chlorine^{38}$, introducing said hydrocarbon materials into a counting zone of a volume substantially equal to that of said activation zone, retaining said hydrocarbon materials in said counting zone for a period of time substantially equal to the residence time of said hydrocarbon materials in said activation zone, and counting the number of atomic disintegrations occurring in said hydrocarbon materials during the time said hydrocarbon materials are retained in said counting zone.

2. A process according to claim 1 wherein said stream of hydrocarbon materials is an aliquot portion of an original stream of petroleum crude oil which latter stream, originally containing at least 25 lbs. of sodium chloride per thousand barrels, has been desalted to reduce its salt content to not more than 10 lbs. per thousand barrels, wherein said neutrons are derived from a beryllium-radium neutron source having an activity of from about 2 to about 100 curies, wherein the residence time of said hydrocarbon materials in the activation zone is from about 10 to about 120 minutes, and wherein at least about 5% of the atomic disintegrations occurring in said hydrocarbon materials are counted during the time said hydrocarbon materials are retained in said counting zone.

3. A process according to claim 2 wherein said hydrocarbon materials passed through said activation zone contain more than 1 part per million of vanadium, and wherein said materials are retained in said confined flow path for a period of at least 5 minutes, whereby radioactive isotopes of vanadium are substantially completely disintegrated before said hydrocarbon materials enter said counting zone.

4. A process according to claim 1 wherein the chlorine containing substance comprises sodium chloride.

5. A process according to claim 1 wherein the chlorine-containing substance is a mixture comprising chlorides of sodium, magnesium and calcium.

6. A process according to claim 1 wherein the chlorine-containing substance comprises an organic compound and wherein the hydrocarbon stream comprises a lubricating oil.

7. A process according to claim 1 wherein the chlorine-containing substance comprises an alkyl halide having 1 to 2 carbon atoms per molecule and wherein the hydrocarbon stream comprises isobutylene.

8. An apparatus for measuring the chlorine content of a hydrocarbon oil which comprises in combination a neutron source disposed in an enclosed activation chamber of known free volume, a means including a conduit for feeding oil to the activation chamber at a predetermined rate, means for measuring the rate of oil being fed, a counting chamber of a volume substantially equal to that of said activation chamber, a scintillation tube adapted for counting atomic distintegrations disposed within said chamber, a conduit for passing oil from the activation chamber to the counting chamber, a conduit for withdrawing oil from the counting chamber, and means for recording the count of the scintillation tube.

9. An apparatus according to claim 8 wherein the scintillation tube comprises a crystal of thallium activated sodium chloride.

10. An apparatus according to claim 8 wherein the scintillation tube comprises benzene.

11. An apparatus according to claim 8 wherein the neutron source comprises beryllium and radium.

12. An apparatus according to claim 8 wherein the means for recording the number of atomic disintegrations comprises a photoelectric cell.

References Cited in the file of this patent

UNITED STATES PATENTS

| | | |
|---|---|---|
| 2,351,028 | Fearon | June 13, 1944 |
| 2,463,733 | Albaugh | Mar. 8, 1949 |
| 2,476,810 | Brunner et al. | July 19, 1949 |
| 2,640,936 | Pajes | June 2, 1953 |